US010796345B1

(12) United States Patent
Qureshi (10) Patent No.: US 10,796,345 B1
(45) Date of Patent: Oct. 6, 2020

(54) OFFLINE VIDEO ADVERTISING

(71) Applicant: Amazon Technologies, Inc., Seattle, WA (US)

(72) Inventor: Aneeb Naveed Qureshi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 14/667,913

(22) Filed: Mar. 25, 2015

(51) Int. Cl.
*G06Q 30/02* (2012.01)
*H04L 29/06* (2006.01)

(52) U.S. Cl.
CPC ......... *G06Q 30/0277* (2013.01); *H04L 65/60* (2013.01); *H04L 65/602* (2013.01)

(58) Field of Classification Search
None
See application file for complete search history.

(56) References Cited

U.S. PATENT DOCUMENTS

| | | | |
|---|---|---|---|
| 8,701,145 B1* | 4/2014 | Berger | H04N 21/4147 725/32 |
| 2002/0118686 A1* | 8/2002 | Gupta | H04M 7/006 370/401 |
| 2012/0198492 A1* | 8/2012 | Dhruv | H04N 21/23424 725/32 |
| 2014/0074615 A1* | 3/2014 | Hope | G06Q 30/0267 705/14.64 |

* cited by examiner

*Primary Examiner* — Chrystina E Zelaskiewicz
*Assistant Examiner* — Michael J Cross
(74) *Attorney, Agent, or Firm* — Thomas Horstemeyer, LLP (57) ABSTRACT

Disclosed are various embodiments for offline advertisement presentation. Media items and advertisements are stored on a client device. During playback of the media item, in absence of a network connection, a stored advertisement is presented to a user. This may be facilitated by a proxy advertising service implemented in the client device.

20 Claims, 6 Drawing Sheets

OFFLINE VIDEO ADVERTISING

BACKGROUND

Advertisements may be included with video content delivered to a client. If the video content is streamed using a network connection, the advertisements may be requested during the stream for presentation. In absence of a network connection, a client may be unable to request advertisements. This may result in reduced advertising revenue for a media distribution service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Media distribution services may include advertisements in distributed media in order to generate revenue from advertisement impressions. For example, an advertisement may be overlayed or embedded concurrently with rendered video. As another example, video content may temporarily cease rendering, with the advertisement being rendered instead. The video content then resumes after the advertisement has completed. When video content is streamed from the media distribution service, an advertising service may dynamically determine advertisements that are targeted to a customer. The advertisements are then communicated to the client contemporaneous to the video stream.

Media distribution services may also allow a client to cache or download media items for later consumption after the media item has been fully downloaded. This may include a client viewing the media item in absence of a network connection to the advertising service. In absence of a network connection to the advertising service, the client may be unable to present advertisements to a user. This deprives the media distribution service of advertising revenue from advertisement impressions.

A client may obtain advertisements for presentation during offline consumption of media items according to various approaches. In some embodiments, a media distribution service may communicate advertisements for storage by a client in response to a client requesting a media item capable of being viewed in absence of a network connection. In other embodiments, a client may implement a proxy advertising server. The proxy advertising server may download or otherwise obtain advertisements for storage on the client for later presentation. When a client application, while rendering a media item, attempts to communicate with an advertising server via a network, the request is first communicated to the proxy advertising server. If a network connection is available, the proxy advertising server may forward the request to the advertising server via the network connection. Otherwise, the proxy advertising server may communicate a stored advertisement to the client application in response to the request. The proxy advertising server may also track media consumption histories, interaction histories, advertising presentation histories, or other data for communication to an advertising server when a network connection is available. This allows the advertising server to more accurately track advertisement presentations, and target advertisements for media items being consumed offline.

In the following discussion, a general description of the system and its components is provided, followed by a discussion of the operation of the same.

Figure 1:
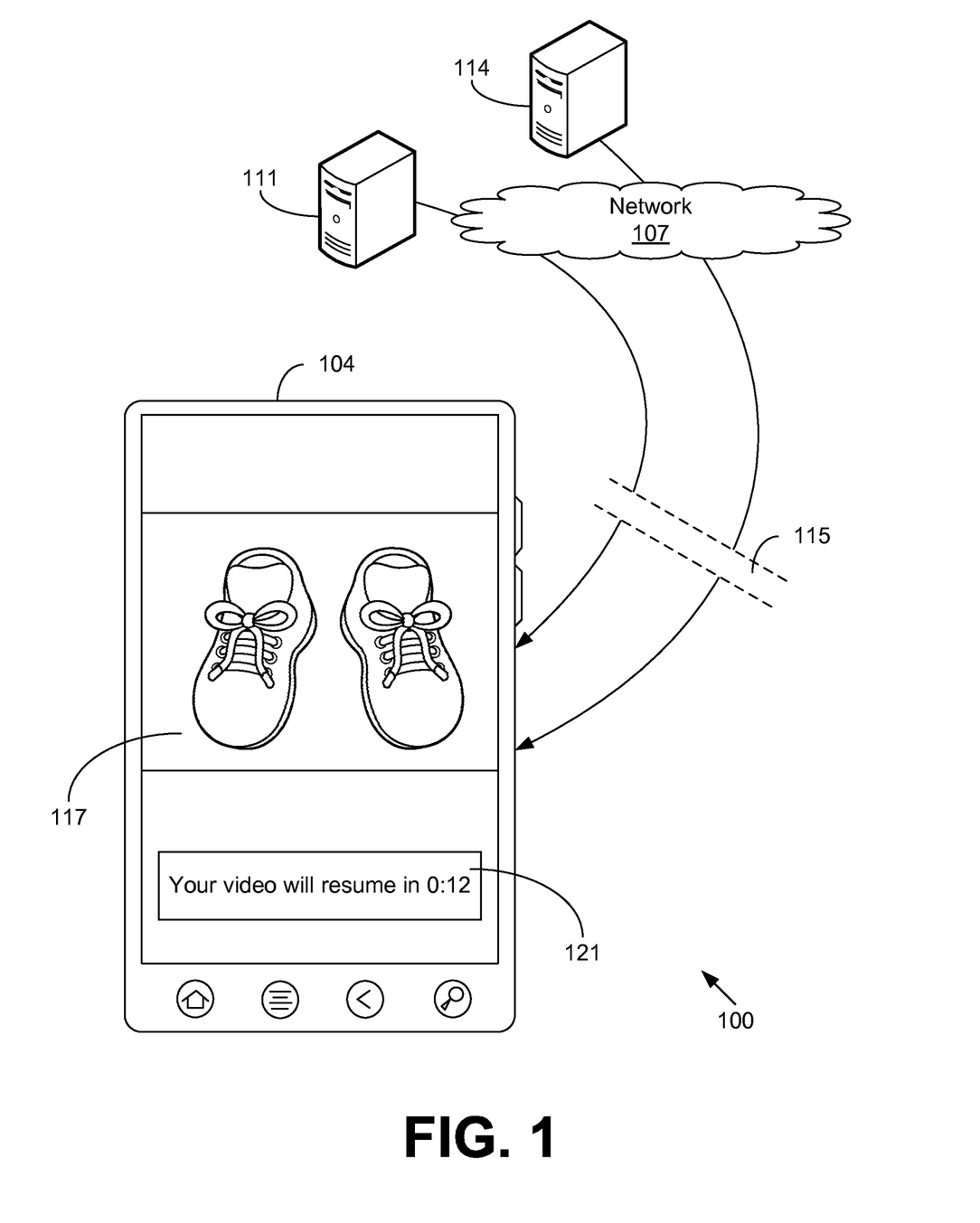
FIG. 1 is a drawing depicting an example scenario according to various embodiments of the present disclosure.

With reference to FIG. 1, shown is an example scenario 100 depicting a presentation of an advertisement on a client 104 in absence of a connection to an advertising service via the network 107. Depicted in the example scenario 100 are the client 104, a server 111 implementing a media distribution service, and a server 114 implementing an advertising service. The operations of the media distribution service and advertising service will be discussed in additional detail below. Although the server 111 and server 114 are accessible by the client 104 through a connection via the network 107, element 115 visually indicates that no network 107 connection is present. The client 104 is an example of a computing device capable of rendering a media item obtained from a server 111 implementing a media distribution service. Displayed on the client 104 is a rendering of video 117 associated with an advertisement. Included in the video 117 is a message 121 indicating that the consumed media item will resume playback in twelve seconds. The example scenario 100 serves to depict a client 104 rendering advertising content in absence of a network 107 connection to a media distribution service or advertising service, executed on servers 111 or 114, respectively.

Figure 2:
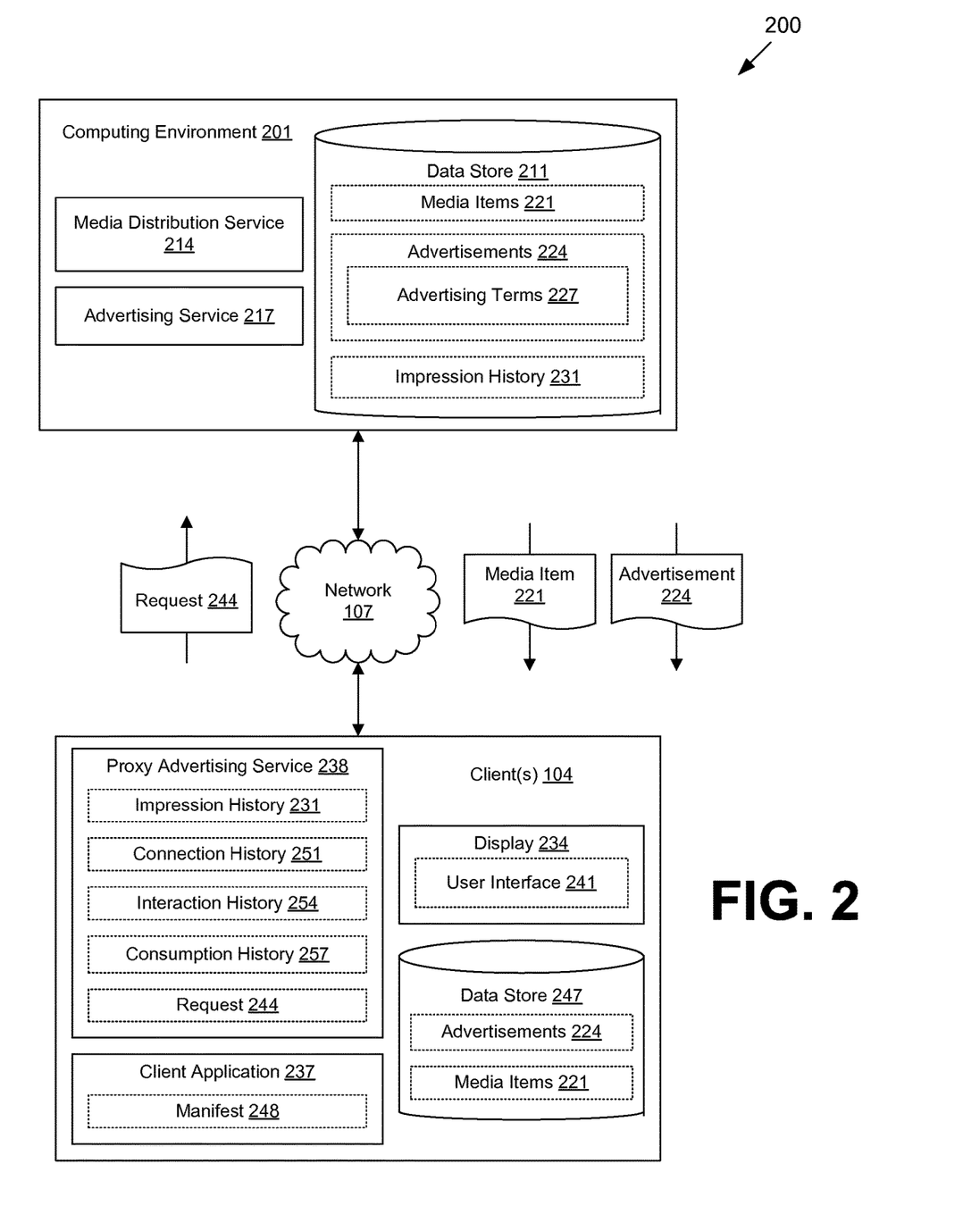
FIG. 2 is a drawing of a networked environment according to various embodiments of the present disclosure.

Moving on to FIG. 2, shown is a networked environment 200 according to various embodiments. The networked environment 200 includes a computing environment 201, and a client 104 (FIG. 1), which are in data communication with each other via a network 107 (FIG. 1). The network 107 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 201 may comprise, for example, a server computer or any other system providing computing capability. Alternatively, the computing environment 201 may employ a plurality of computing devices that may be arranged, for example, in one or more server banks or computer banks or other arrangements. Such computing devices may be located in a single installation or may be distributed among many different geographical locations.

For example, the computing environment 201 may include a plurality of computing devices that together may comprise a hosted computing resource, a grid computing resource and/or any other distributed computing arrangement. In some cases, the computing environment 201 may correspond to an elastic computing resource where the allotted capacity of processing, network, storage, or other computing-related resources may vary over time.

Various applications and/or other functionality may be executed in the computing environment 201 according to various embodiments. Also, various data is stored in a data store 211 that is accessible to the computing environment 201. The data store 211 may be representative of a plurality of data stores 211 as can be appreciated. The data stored in the data store 211, for example, is associated with the operation of the various applications and/or functional entities described below.

The components executed on the computing environment 201, for example, include a media distribution service 214, and advertising service 217, and other applications, services, processes, systems, engines, or functionality not discussed in detail herein. The media distribution service 214 is executed to facilitate the distribution of media items 221 to clients 104 via the network 107. To this end, the media distribution service 214 may be configured to facilitate the download or streaming of media items 221 by clients 104. The media distribution service 214 may be further configured to encode, decode, compress, or otherwise transform media items 221 for communication to clients 104. Additionally, the media distribution service 214 may be configured to process payment instruments such as credit cards, prepaid accounts, or other payment instruments to consummate financial transactions for access to the media distribution service 214 or the distribution of media items 221. Additionally, the media distribution service 214 may be configured to encode data such as network pages for rendering by a client 104 to facilitate interactions by the client 104 with the media distribution service 214. Such network pages may include, for example, user interfaces to facilitate navigating a catalog of media items 221, maintaining selections of media items 221 such as queues, libraries, or other selections, embedded or otherwise encoded media players, or other data. The media distribution service 214 may also be configured to perform additional operations.

The advertising service 217 is configured to select advertisements 224 for communication to a client 104 in association with a rendering of a media item 221. To this end, the advertising service 217 may select advertisements 224 as being targeted or directed to a user of a client 104. Furthermore, the advertising service 217 selects advertisements 224 according to advertising terms 227 defining targeting criteria, limits on numbers or frequencies of presentations for advertisements 224, time windows or ranges for presenting a respective advertisement 224, revenue or payments associated with advertisement 224 presentations, and potentially other data.

The data stored in the data store 211 includes, for example, media items 221, advertisements 224, an impression history 231, and potentially other data. Media items 221 may include any media distributable via the media distribution service 214, including audio media items 221, video media items 221, image media items 221, text media items 221, or other media items 221 as can be appreciated. Media items 221 may be encoded for complete download by a client 104 for offline playback without a need for a network 107 connection. Media items 221 may also be encoded for streaming via the network 107. This may include encoding media items 221 into time segments, each corresponding to multiple bit rates or quality rates, to facilitate variable bit rate streaming. Media items 221 may also be encoded by another approach.

Advertisements 224 are encoded for presentation contemporaneous to the rendering of a media item 221 to solicit the purchase of an item, solicit the navigation to a network page or other resource, or solicit another behavior. In some embodiments, advertisements 224 may be encoded for overlay on a concurrently rendered media item 221. For example, advertisements 224 may be encoded as a pop up, navigation element, button, window, or other user interface element overlayed onto a rendered media item 221. In other embodiments, advertisements 224 may be encoded according to a similar approach as a media item 221. In such an embodiment, rendering of a media item 221 may be temporarily suspended to allow the rendering of an advertisement 224 as preceding, subsequent, or interstitial content with respect to the media item 221.

Advertisements 224 may also include navigation elements such as links, buttons, or other elements that may be interacted with via a client 104. For example, advertisements 224 may encode a link that, when clicked, tapped, or otherwise interacted with via a client 104, triggers a navigation of the client 104 to a network page corresponding to an advertised product, service, or another network page. In some embodiments, advertisements 224 may be encoded to render as a function of whether the client 104 has an available network 107 connection. For example, the advertisement 224 may exclude navigation aids or other user interface elements in absence of a network 107 connection. The advertisement 224 may also include different content depending on whether or not a network 107 connection is available. Advertisements 224 may also be encoded by another approach.

The impression history 231 indicates data corresponding to the past presentations of advertisements 224. This may include, for example, a number of presentations for advertisements 224, an indication of clients 104 or users to which the advertisements 224 were presented, a rate of presentation for advertisements 224, or other data. The impression history 231 may be compared to advertising terms 227 indicating a maximum number of presentations or impressions for an advertisement 224 to determine if the advertisement 224 should be communicated to a client 104. The impression history 231 may also be used to perform other actions, as will be discussed in more detail below.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 234. The display 234 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 104 may be configured to execute various applications such as a client application 237, a proxy advertising service 238 and/or other applications. The client application 237 may be executed in a client 104, for example, to access network content served up by the computing environment 201 and/or other servers, thereby rendering a user interface 241 on the display 234. To this end, the client application 237 may comprise, for example, a browser, a dedicated application, etc., and the user interface 241 may comprise a network page, an application screen, etc.

The proxy advertising service 238 is executed to perform operations similar to the advertising service 217, but as executed on the client 104. Additionally, the proxy advertising service 238 may serve as an intermediary for requests 244 from the client application 237 to the advertising service 217. For example, the proxy advertising service 238 may be configured to forward requests 244 to the advertising service 217 when a network 107 connection to the advertising service 217 is available. When a network 107 connection to the advertising service 217 is unavailable, the proxy advertising service 238 may process the request 244 and communicate a response to the client application 237. The proxy advertising service 238 may also be configured to perform other operations as will be discussed in detail below. The client 104 may be configured to execute applications beyond the client application 237 such as, for example, email applications, social networking applications, word processors, spreadsheets, and/or other applications.

The client 104 may also include a data store 247. The data store 247 may be representative of a plurality of data stores 247 as can be appreciated. The data stored in the data store 247 may include, for example, media items 221, advertisements 224, and other data as can be appreciated.

Next, a general description of the operation of the various components of the networked environment 200 is provided. To begin, a client 104 obtains a media item 221 from a media distribution service 214 via a network 107. In some embodiments, a user of the client 104 may select the media item 221 to be obtained. In other embodiments, a media distribution service 214 may dynamically select a media item 221 for communication to the client 104. The media item 221 may also be obtained by another approach. The media item 221 may then be stored in the data store 247.

Next, before playback of the media item 221, the client 104 obtains one or more advertisements 224 to be presented during playback of the media item 221. In some embodiments, the advertising service 217 determines one or more advertisements 224 targeted to the client 104. Approaches for determining targeted advertisements 224 will be discussed in further detail below. The advertisements 224 may then be bundled with a downloaded media item 221 such that a client 104 obtains both the media item 221 and the advertisements 224. A manifest 248 file may also be bundled with the advertisements 224 and media item 221. The manifest 248 may indicate which advertisements 224 will be presented during playback of a media item 221, when the advertisements 224 will be presented during playback of the media item 221, or potentially other data.

In other embodiments, a proxy advertising service 238 or the client application 237 may be configured to obtain advertisements 224 for storage on the client 104. Although the following discussion describes functionality as performed by the proxy advertising service 238, it is understood that such operations may be performed by a client application 237 or other functionality executed in the client 104. For example, the proxy advertising service 238 may communicate a request 244 for advertisements 224 to the advertising service 217. In some embodiments, this may include the proxy advertising service 238 determining one or more targeted advertisements 224 for a client 104 as will be discussed below, and then communicating a request 244 for the targeted advertisements 224 to the advertising service 217. In other embodiments, this may include communicating a request 244 to the advertising service 217 for advertisements 224 without specifying which advertisements 224 should be returned. The advertising service 217 may then communicate, to the client 104, targeted or untargeted advertisements 224. The client 104 then obtains advertisements 224 via the network 107 for storage in the data store 247. The client 104 may also obtain an impression history 231 corresponding to the obtained advertisements 224 for comparison to advertising terms 227 when determining which advertisements 224 will be presented during playback of a media item 221, as will be described below.

In embodiments in which a client 104 communicates a request for advertisements 224 for storage in the data store 247, the proxy advertising service 238 may detect whether a network 107 connection is available to the advertising service 217. This may include, for example, executing a background process or other service that determines whether the network 107 connection is available at a predefined interval, or according to other criteria. In response to the network 107 connection being determined to be available, the proxy advertising service 238 may then communicate the request 244 for advertisements 224. In other embodiments, the request 244 may be communicated in response to a network 107 connection being initiated, a network 107 interface being activated, or in response to another event.

As was addressed above, the advertisements 224 obtained by the client 104 may be targeted with respect to a client 104 or a user of a client 104. Such targeting may be determined by an advertising service 217, a proxy advertising service 238, a client application 237, or other functionality implemented in the client 104 or computing environment 201. In some embodiments, advertisements 224 may be targeted based on a connection history 251 indicating a frequency, duration, or other attribute of network 107 connection availability.

For example, in embodiments in which a client 104 is frequently connected to the network 107, advertisements 224 having a number of impressions closer to a maximum impression threshold defined in the advertising terms 227 may be selected. As the client 104 is more frequently able to connect to the network 107, the advertising service 217 may be able to update the impression history 231 to reflect advertisement 224 impressions with respect to the client 104, thereby reducing the risk of presenting an advertisement 224 beyond the maximum impression threshold. Similarly, if a client 104 infrequently connects to a network 107, advertisements 224 having a greater maximum impression threshold or having a lower number of recorded impressions may be selected.

Additionally, in some embodiments, the number or duration of advertisements 224 obtained by the client 104 may be determined according to the connection history 251. For example, a client 104 that frequently connects to a network 107 may obtain fewer advertisements 224 as the client 104 may be able to more frequently update the advertisements 224 stored on the client 104. Similarly, a client 104 that less frequently connects to a network may obtain more advertisements 224 to minimize repeated presentations. Advertisements 224 may also be selected according to a connection history 251 by another approach.

Advertisements 224 may also be selected according to an interaction history 254. An interaction history 254 may indicate whether a user of a client 104 clicked, selected, or otherwise interacted with user interface 241 components of an advertisement 224. An interaction history 254 may also indicate whether a user skipped, muted, fast-forwarded or otherwise modified presentation of an advertisement. As interactions indicated in an interaction history 254 may be indicative of an interest of a user with respect to an advertisement 224, the interaction history 254 may be provided as input to determine relevance or sentiment for advertisements 224 as can be appreciated. Advertisements 224 may also be selected according to an interaction history 254 by another approach.

Advertisements may also be selected according to a consumption history 257 indicating media item 221 consumption habits with respect to a client 104. This may indicate, for example, a number of media items 221 consumed, a duration of media items 221 consumed, or other attributes. The number or duration of advertisements 224 obtained may then be scaled according to the number or duration of media items 221 consumed via the client 104. Advertisements 224 may also be selected according to a consumption history 257 by another approach.

Next, the client application 237 initiates playback of the media item 221 stored on the client 104. In this example, a network 107 connection to the computing environment 201 is unavailable. In response to initiating playback of the media item 221, the client application 237 may attempt to load a manifest 248 corresponding to the media item 221. In embodiments in which a manifest 248 was bundled with the media item 221, this may include loading a stored manifest 248. In other embodiments, the client application 237 may attempt to communicate a request 244 for a manifest 248 to the advertising service 217. In such an embodiment, the client application 237 may be configured to communicate requests 244 to the proxy advertising service 238 for forwarding to the advertising service 217 when a network 107 connection is available. In such an embodiment, as the network 107 connection is unavailable, the proxy advertising service 238 may generate a manifest 248 for communication to the client application 237 in response to the request 244.

The proxy advertising service 238 may select advertisements 224 stored in the client 104 to be presented during playback of the media item 221. These selected advertisements 224 may then be indicated in the manifest 248. In embodiments in which advertisements 224 were bundled with a media item 221, the proxy advertising service 238 may generate a manifest 248 indicating the bundled advertisements 224. In other embodiments, advertisements 224 may be selected from a pool of stored advertisements 224 as being targeted to a client 104 or user of the client 104 by similar approaches as were described above. Advertisements 224 may also be selected from the pool of stored advertisements 224 according to advertising terms 227. For example, advertisements 224 may be selected as having a number of impressions falling below a maximum impression threshold as indicated in a impression history 231 and advertising terms 227. Advertisements 224 may also be selected according to the advertising terms 227 by another approach. For example, the advertising terms 227 may indicate specific media items 221, genres of media items 221, categories of media items 221, or other attributes of media items 221 into which an advertisement 224 may or may not be presented. Advertisements 224 may also be selected by another approach.

After the proxy advertising service 238 has selected advertisements 224, the client application 237 then renders the advertisements 224 contemporaneous to a rendering or playback of the media item 221. This may include rendering the advertisement 224 before, during, or after playback of a media item 221. This may also include ceasing rendering of the media item 221 to render the advertisement 224, or rendering the media item 221 and advertisement 224 concurrently. As advertisements 224 are rendered, the proxy advertising service 238 may then record an indication of the rendering in an impression history 231. The proxy advertising service 238 may also store an interaction history 254 with respect to the presented advertisements 224.

In addition to the impression history 231 and interaction history 254, the proxy advertising service 238 may also maintain and update a connection history 251 or consumption history 257. In response to a network 107 becoming available during or after playback of the media item 221, the proxy advertising service 238 may submit the stored impression history 231, interaction history 254, connection history 251, consumption history 257, or other data to the advertising service 217.

Although the media distribution service 214 and advertising service 217 are depicted as distinct components of the computing environment 201, it is understood that the functionality described above with respect to the media distribution service 214 and advertising service 217 may be implemented in shared services or applications executed within the computing environment 201. Additionally, although the client application 237 and proxy advertising service 238 it is understood that any of the functionality described above with respect to the proxy advertising service 238 may be implemented in the client application 237.

Figure 3:
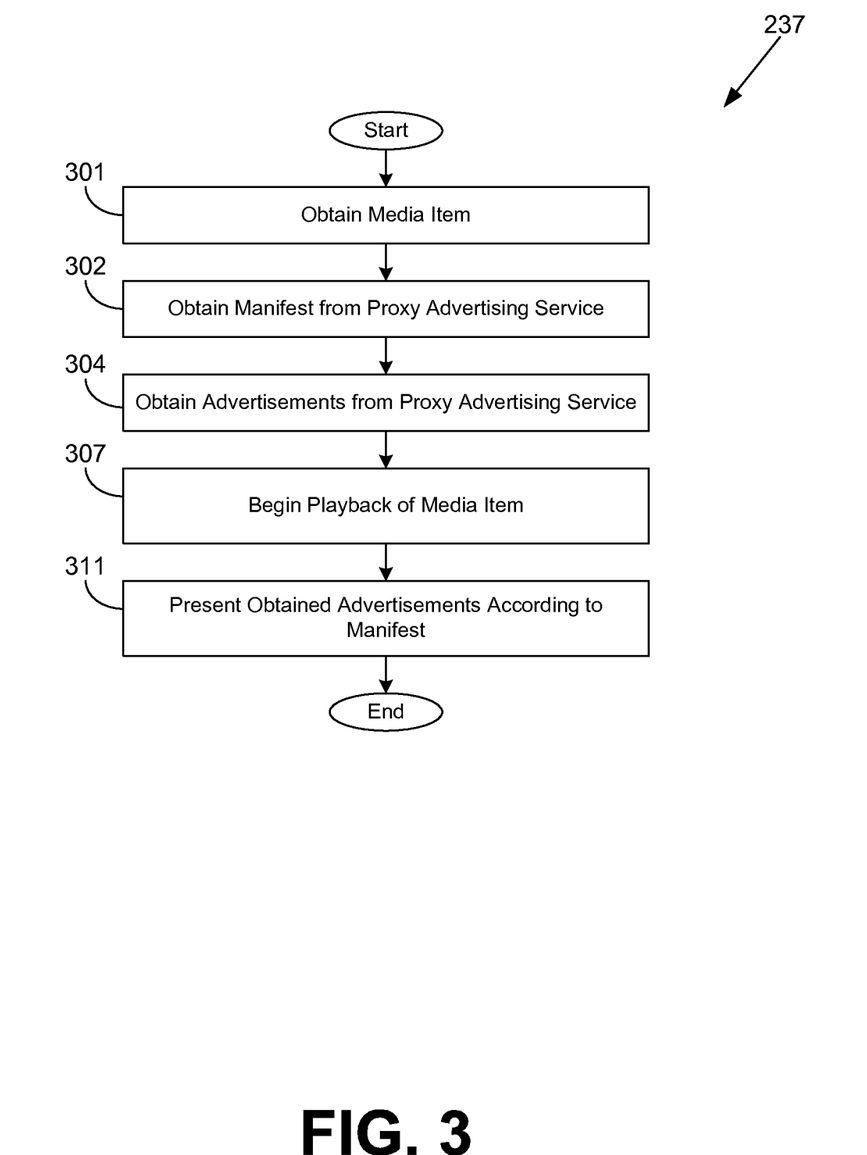
FIG. 3 is a flowchart illustrating one example of functionality implemented as portions of a client application executed in a client in the networked environment of FIG. 2 according to various embodiments of the present disclosure.

Referring next to FIG. 3, shown is a flowchart that provides one example of the operation of a portion of the client application 237 according to various embodiments. It is understood that the flowchart of FIG. 3 provides merely an example of the many different types of functional arrangements that may be employed to implement the operation of the portion of the client application 237 as described herein. As an alternative, the flowchart of FIG. 3 may be viewed as depicting an example of elements of a method implemented in the client 104 (FIG. 1) according to one or more embodiments.

Beginning with box 301, the client 104 obtains a media item 221 (FIG. 2) from a media distribution service 214 (FIG. 2) via a network 107 (FIG. 2). In some embodiments, a user of the client 104 may select the media item 221 to be obtained. In other embodiments, a media distribution service 214 may dynamically select a media item 221 for communication to the client 104. The media item 221 may also be obtained by another approach. The media item 221 may then be stored in the data store 247.

Next, in box 302, the client application 237 obtains a manifest 248 (FIG. 2) from a proxy advertising service 238 (FIG. 2) executed in the client 104. This may be performed in response to an indication to begin playback of the media item 221 stored in the client 104, or in response to another event. In some embodiments, this may include communicating a request 244 (FIG. 2) to the proxy advertising service 238 for the manifest 248. The manifest 248 may be obtained from an advertising service 217 (FIG. 2) executed in a computing environment 201 (FIG. 2) via proxy advertising service 238 in response to a network 107 connection to the computing environment 201 being available. The manifest 248 may be generated by the proxy advertising service 238 in response to a network 107 connection to the computing environment 201 being unavailable.

After obtaining the manifest 248, the client obtains advertisements 244 (FIG. 2) indicated in the manifest 248 from the proxy advertising service 238 in box 304. In some embodiments, this may include communicating a request 244 to the proxy advertising service 238 for the manifest 248. The advertisements 248 may be obtained from the advertising service 217 via proxy advertising service 238 forwarding the request 244 in response to a network 107 connection to the computing environment 201 being available. The advertisements 248 may also be selected by the proxy advertising service 238 from advertisements 224 stored in the client 104 in response to a network 107 connection to the computing environment 201 being unavailable.

The client application 237 then begins playback of the media item 221 on the client 104 in box 307. Contemporaneous to playback of the media item 221, in box 311, the client application 237 presents the obtained advertisements 224 according to the manifest 248. This may include presenting the advertisements 224 at times or in display 234 (FIG. 2) areas specified by the manifest 248. This may also include rendering the advertisements 224 according to whether a network 107 connection is available. For example, this may include determining whether to include navigation aids or other user interface 241 (FIG. 2) elements in the rendered advertisements 224 according to the presence of the network 107 connection. Advertisements 224 may also be presented by another approach. After presenting the advertisements 224, the process ends.

Figure 4:
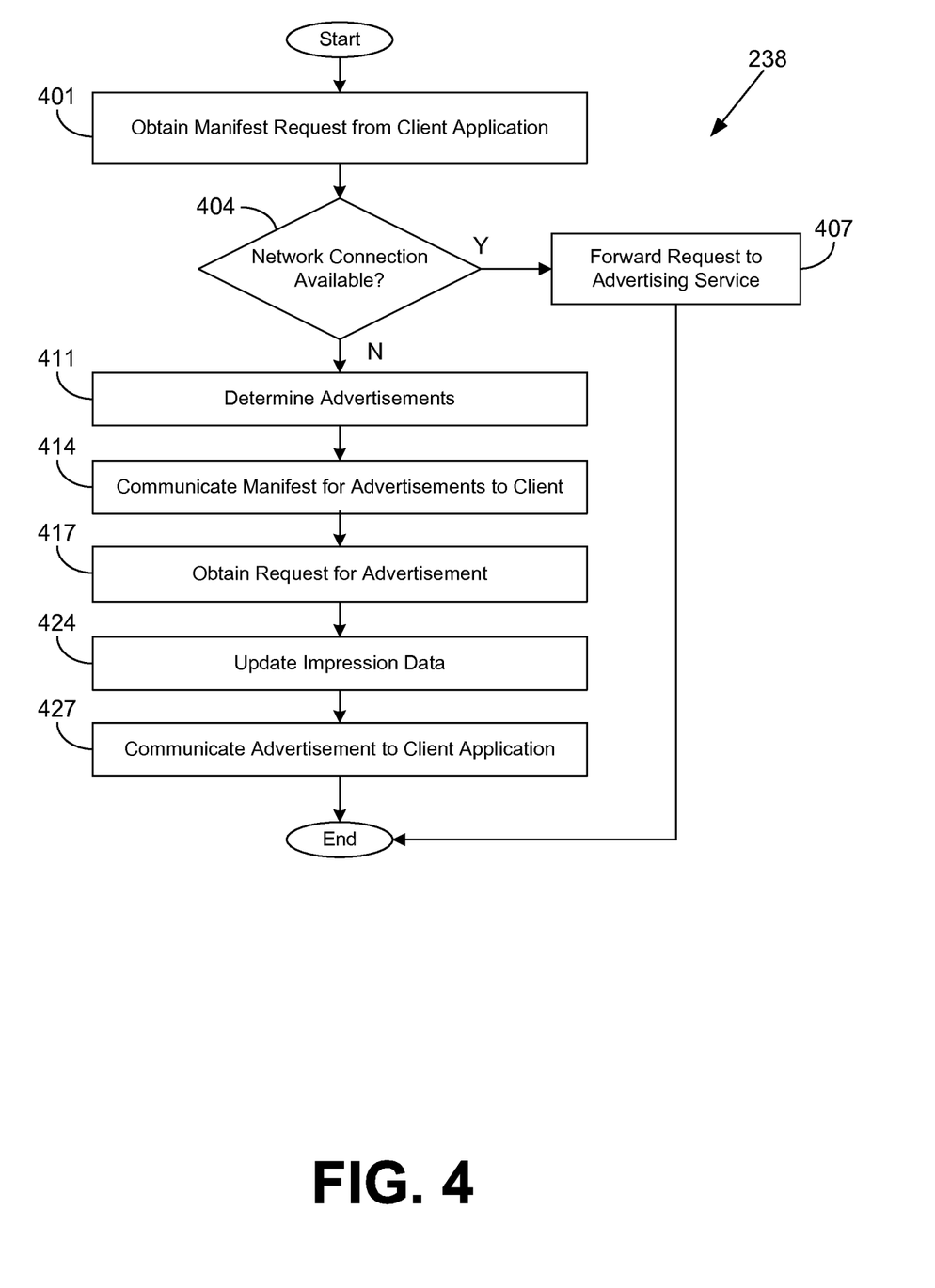
FIGS. 4 and 5 are flowcharts illustrating examples of functionality implemented as portions of a proxy advertising server in a client in the networked environment of FIG. 2 according to various embodiments of the present disclosure.

Turning now to FIG. 4, shown is a flowchart that provides one example of the operation of a portion of the proxy advertising service 238 according to various embodiments. It is understood that the flowchart of FIG. 4 provides merely an example of the many different types of functional arrangements that may be employed to implement the operation of the portion of the advertising service 238 as described herein. As an alternative, the flowchart of FIG. 4 may be viewed as depicting an example of elements of a method implemented in the client 104 (FIG. 1) according to one or more embodiments.

Beginning with box 401, the proxy advertising service 238 obtains a request 244 (FIG. 2) for a manifest 248 (FIG. 2) corresponding to a media item 221 (FIG. 1) to be played by a client application 237 (FIG. 2). In box 404 the proxy advertising service 238 determines if a network 107 (FIG. 1) connection is available to a computing environment 201 (FIG. 2) executing an advertising service 217 (FIG. 2). If the network 107 is available, the process advances to box 407 where the proxy advertising service 238 forwards the request 244 to the advertising service 217 via the network 107, after which the process ends. Otherwise, the process advances to box 407 where the proxy advertising service 238 determines advertisements 224 (FIG. 2) to be indicated in the manifest 248.

The advertisements 224 determined by the proxy advertising service 238 for inclusion in the manifest 248 may be targeted with respect to a client 104 or a user of a client 104. In some embodiments, advertisements 224 may be targeted based on a connection history 251 (FIG. 2) indicating a frequency, duration, or other attribute of network 107 connection availability. Advertisements 224 may also be selected according to an interaction history 254 (FIG. 2), a consumption history 257 (FIG. 2) indicating media item 221 consumption habits with respect to a client 104, selected according to advertising terms 227 (FIG. 2) for the advertisements 224, or by another approach. Additionally, in some embodiments, advertisements 224 may be predefined as corresponding to a media item 221, such as being included or bundled with a downloaded media item 221. In such an embodiment, the advertisements 224 included in the manifest 248 would correspond to the predefined advertisements 224. Advertisements 224 may also be determined by another approach.

After determining the advertisements 224 for indication in the manifest 248, the proxy advertising service 238 communicates the manifest 248 to the client application 237 in box 414. Next, in box 417, the proxy advertising service 238 obtains a request 244 for an advertisement 224 from the client application 237. The proxy advertising service 238 then updates the impression history 254 (FIG. 2) to indicate an impression of the requested advertisement 224 in box 424, and then communicates the requested advertisement 224 to the client application 237 in box 427, after which the process ends.

Figure 5:
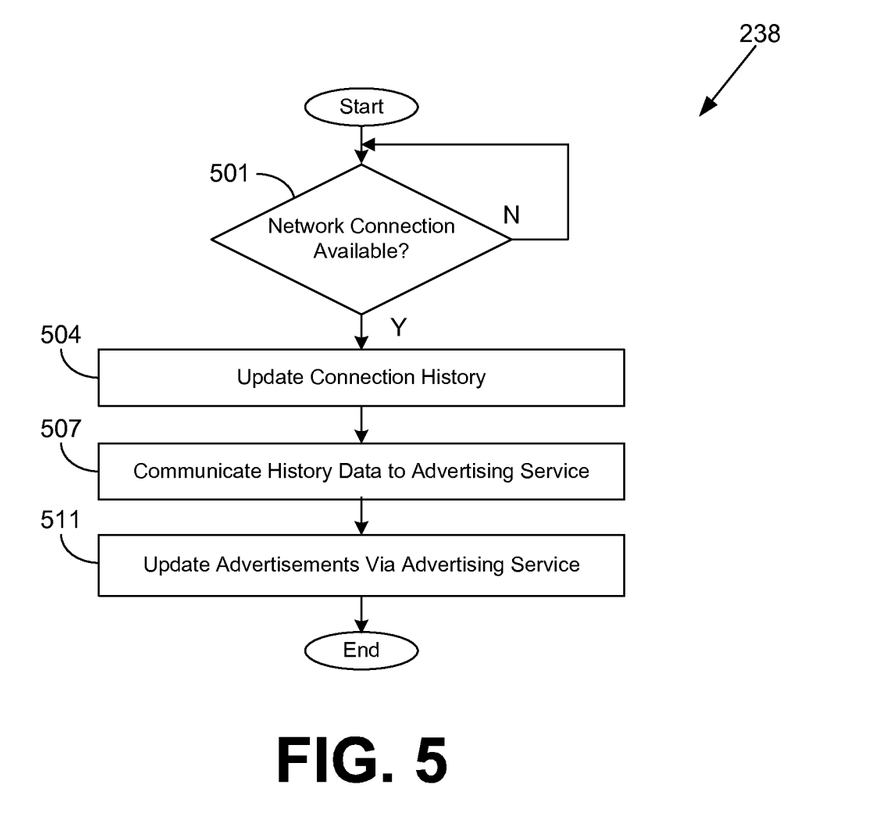

Moving on to FIG. 5, shown is a flowchart that provides one example of the operation of a portion of the proxy advertising service 238 according to various embodiments. It is understood that the flowchart of FIG. 5 provides merely an example of the many different types of functional arrangements that may be employed to implement the operation of the portion of the advertising service 238 as described herein. As an alternative, the flowchart of FIG. 5 may be viewed as depicting an example of elements of a method implemented in the client 104 (FIG. 1) according to one or more embodiments.

Beginning with box 501, the proxy advertising service 238 determines if a network 107 (FIG. 1) connection is available to a computing environment 201 (FIG. 2). This may be performed at a predefined interval, in response to an activation of a network 107 interface of the client 104, in response to another event or performed according to another approach. In response to determining that the network 107 connection is available, the process advances to box 504 where the proxy advertising service 238 updates a connection history 251 (FIG. 2) associated with the client 104. This may include updating the connection history 251 to indicate an instance of the network 107 connection being available, a duration for the network 107 connection, or other data.

Next, in box 507, the proxy advertising service 238 communicates history data via the network 107 to the advertising service 217 (FIG. 2) executed in the client 104. History data may include, for example, an impression history 231 (FIG. 2), a connection history 251, an interaction history 254 (FIG. 2), a consumption history 257 (FIG. 2), and potentially other data. The history data may then facilitate operations of the advertising service 217 such as determining targeted advertisements 224 (FIG. 2), ensuring compliance with advertising terms 227 (FIG. 2), determining advertising revenue from impressions, or other operations as can be appreciated.

After communicating the history data to the advertising service 217, the proxy advertising service 238 updates an amount of advertisements 224 stored on the client 104. This may include, for example, removing advertisements 224 having a number of total impressions meeting or exceeding a threshold indicated in advertising terms 227, or having an expired presentation time window. For example, the advertising service 217 may communicate a notification to the proxy advertising service 238 indicating those advertisements 224 that should be deleted from the client 104 as the indicated advertisements 224 should no longer be presented per the advertising terms 227. Updating the advertisements 224 stored on the client 104 may also include obtaining advertisements 224 via the advertising service 217 that are targeted with respect to the client 104 or a user of the client 104. Such targeting may be based on history data, including the history data discussed in box 507, and potentially based on other data. The advertisements 224 stored on the client 104 may also be updated by another approach. After updating the stored advertisements 224, the process ends.

Figure 6:
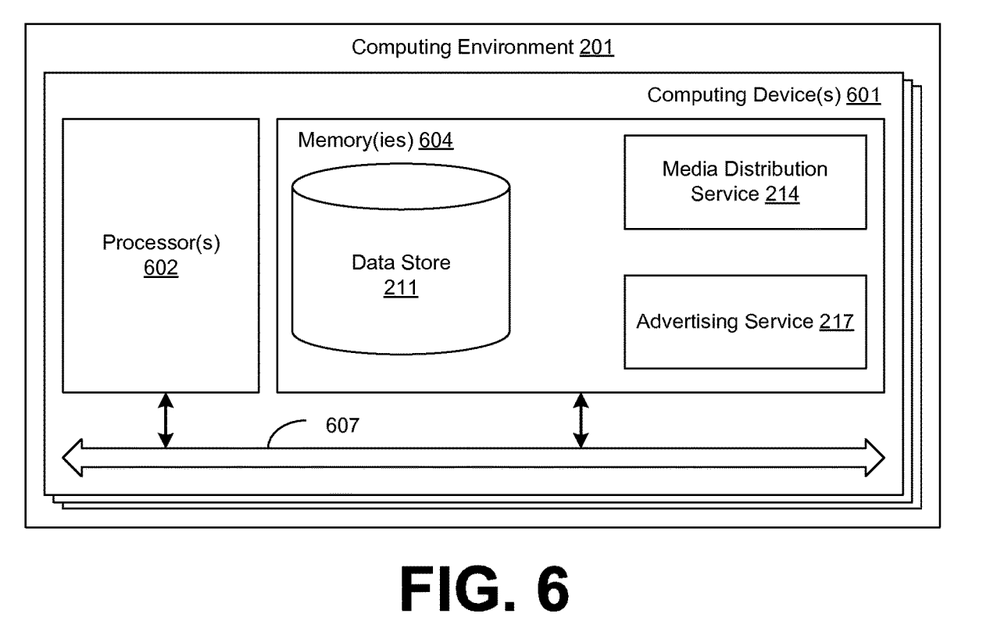
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 201 according to an embodiment of the present disclosure. The computing environment 201 includes one or more computing devices 601. Each computing device 601 includes at least one processor circuit, for example, having a processor 602 and a memory 604, both of which are coupled to a local interface 607. To this end, each computing device 601 may comprise, for example, at least one server computer or like device. The local interface 607 may comprise, for example, a data bus with an accompanying address/control bus or other bus structure as can be appreciated.

Stored in the memory 604 are both data and several components that are executable by the processor 602. In particular, stored in the memory 604 and executable by the processor 602 are a media distribution service 214, an advertising service 217, and potentially other applications. Also stored in the memory 604 may be a data store 211 and other data. In addition, an operating system may be stored in the memory 604 and executable by the processor 602.

Figure 7:
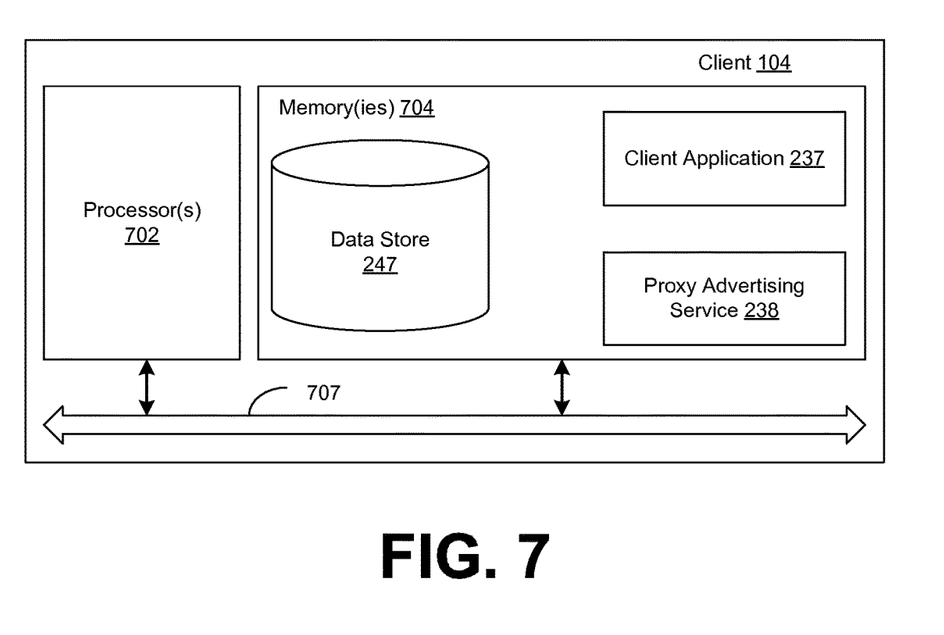
FIG. 7 is a schematic block diagram that provides one example illustration of a computing environment employed in the networked environment of FIG. 2 according to various embodiments of the present disclosure.

With reference to FIG. 7, shown is a schematic block diagram of the client 104 according to an embodiment of the present disclosure. Each client 104 includes at least one processor circuit, for example, having a processor 702 and a memory 704, both of which are coupled to a local interface 707. To this end, each client 104 may comprise, for example, at least one server computer or like device. The local interface 707 may comprise, for example, a data bus with an accompanying address/control bus or other bus structure as can be appreciated.

Stored in the memory 704 are both data and several components that are executable by the processor 702. In particular, stored in the memory 704 and executable by the processor 702 are a client application 237, a proxy advertising service 238, and potentially other applications. Also stored in the memory 704 may be a data store 247 and other data. In addition, an operating system may be stored in the memory 704 and executable by the processor 702.

It is understood that there may be other applications that are stored in the memory 604 or 704 and are executable by the processor 602 or 702 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 604 or 704 and are executable by the processor 602 or 702. In this respect, the term "executable" means a program file that is in a form that can ultimately be run by the processor 602 or 702. Examples of executable programs may be, for example, a compiled program that can be translated into machine code in a format that can be loaded into a random access portion of the memory 604 or 704 and run by the processor 602 or 702, source code that may be expressed in proper format such as object code that is capable of being loaded into a random access portion of the memory 604 or 704 and executed by the processor 602 or 702, or source code that may be interpreted by another executable program to generate instructions in a random access portion of the memory 604 or 704 to be executed by the processor 602 or 702, etc. An executable program may be stored in any portion or component of the memory 604 or 704 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 604 or 704 is defined herein as including both volatile and nonvolatile memory and data storage components. Volatile components are those that do not retain data values upon loss of power. Nonvolatile components are those that retain data upon a loss of power. Thus, the memory 604 or 704 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 602 or 702 may represent multiple processors 602 or 702 and/or multiple processor cores and the memory 604 or 704 may represent multiple memories 604 or 704 that operate in parallel processing circuits, respectively. In such a case, the local interface 607 or 707 may be an appropriate network that facilitates communication between any two of the multiple processors 602 or 702, between any processor 602 or 702 and any of the memories 604 or 704, or between any two of the memories 604 or 704, etc. The local interface 607 or 707 may comprise additional systems designed to coordinate this communication, including, for example, performing load balancing. The processor 602 or 702 may be of electrical or of some other available construction.

Although the client application 237 and proxy advertising service 238, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4 and 5 show the functionality and operation of an implementation of portions of the client application 237 or proxy advertising service 238. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 602 or 702 in a computer system or other system. The machine code may be converted from the source code, etc. If embodied in hardware, each block may represent a circuit or a number of interconnected circuits to implement the specified logical function(s).

Although the flowcharts of FIGS. 3, 4 and 5 show a specific order of execution, it is understood that the order of execution may differ from that which is depicted. For example, the order of execution of two or more blocks may be scrambled relative to the order shown. Also, two or more blocks shown in succession in FIGS. 3, 4 and 5 may be executed concurrently or with partial concurrence. Further, in some embodiments, one or more of the blocks shown in FIGS. 3, 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the client application 237 and proxy advertising service 238, that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including client application 237 or proxy advertising service 238, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same client 104, computing device 601, or in multiple computing devices in the same computing environment 201. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a client computing device, the program, when executed, causing the client computing device to at least:
   receive a request for a manifest corresponding to a video media item stored in the client computing device, the video media item associated with an advertising service executed on another computing device, the advertising service configured to select an advertisement for communication to the client computing device, the request associated with a network connection to the advertising service;
   communicate, in response to the network connection to the advertising service executed on the another computing device being unavailable, a proxied request for a manifest to a proxy advertising service executed by the client computing device;
   maintain the proxy advertising service, the proxy advertising service causing the client computing device to at least:
   obtain a plurality of video advertisements from the proxy advertising service;
   determine a connection history of the client computing device, wherein the connection history indicates how frequently the network connection to the advertising service is available:
   select a video advertisement from the plurality of video advertisements based upon the connection history of the client computing device, wherein a lower frequency of availability of the network connection causes a video advertisement having a higher maximum impression threshold to be selected;
   generate a manifest that indicates the video advertisement is to be presented contemporaneous to a rendering of the video media item;
   store an indication of a presentation of the video advertisement, in response to the network connection to the advertising service being unavailable;
   in response to the network connection to the advertising service being available, communicate the indication of the presentation to the advertising service; and
   present the video advertisement for rendering by the client computing device contemporaneous to the rendering of the video media item.

2. The non-transitory computer-readable medium of claim 1, wherein the video advertisement is determined based at least in part on a frequency of availability of the network connection to the advertising service or a duration of availability of the network connection to the advertising service.

3. A system, comprising:

a client computing device; and an application executed in the client computing device, the application comprising causing the client computing device to at least:

receive a request for a manifest corresponding to a media item stored in the client computing device, the media item associated with an advertising service executed on another computing device, the request associated with a network connection to the advertising service;

determine a connection history of the client computing device, wherein the connection history indicates how frequently the network connection to the advertising service is available;

determine, in response to the network connection to the advertising service executed on another computing device being unavailable, an advertisement for presentation during a rendering of a media item, the advertisement and the media item being stored in the client computing device, the advertisement selected based upon a connection history of the client computing device, wherein a lower frequency of availability of the network connection causes the advertisement having a higher maximum impression threshold to be selected;

generate a manifest that indicates the advertisement is to be presented by the client computing device contemporaneous to the rendering of the media item; and present the advertisement for rendering by the client computing device contemporaneous to the rendering of the media item.

4. The system of claim 3, wherein the advertisement is determined based at least in part on a frequency of availability of the network connection to the advertising service or a duration of availability of the network connection to the advertising service.

5. The system of claim 3, wherein the application further causes the client computing device to determine, based at least in part on a frequency of availability of the network connection to the advertising service or a duration of availability of the network connection to the advertising service, a number of presentations associated with the advertisement or a frequency of presentation associated with the advertisement.

6. The system of claim 3, wherein the advertisement is determined based at least in part on advertising terms stored in the client computing device.

7. The system of claim 6, wherein the advertising terms define at least one of: a maximum number of presentations of a respective advertisement, a maximum rate of presentation for the respective advertisement, or a date range for presenting the respective advertisement.

8. The system of claim 3, further comprising:

a proxy advertising service application executed in the client computing device, the proxy advertising service application causing the client computing device to at least:

select, in response to a request from the application for the advertisement, the advertisement; and wherein the request is communicated to the proxy advertising service application.

9. The system of claim 3, wherein the advertisement is included in a plurality of advertisements, and the application further causes the client computing device to:

obtain, in response to determining that the network connection to the advertising service is available, the plurality of advertisements from the advertising service; and wherein the advertisement is determined by selecting the advertisement from the plurality of advertisements.

10. The system of claim 3, wherein the application further causes the client computing device to at least:

obtain the advertisement contemporaneous to obtaining the media item; and store the advertisement and the media item in the client computing device.

11. The system of claim 3, wherein the media item is one of a plurality of media items, and the advertisement is obtained based at least in part on media consumption habits associated with the client computing device and the plurality of media items.

12. The system of claim 3, wherein the application further causes the client computing device to at least:

store an indication of a presentation of the advertisement in the client computing device; and communicate, in response to the network connection with the advertising service being available, the indication to the advertising service.

13. A method, comprising:

receiving, by a client computing device, a request for a manifest corresponding to a media item stored in the client computing device, the media item associated with an advertising service executed on another computing device, the request associated with a network connection to the advertising service;

communicating, by the client computing device, in response to the network connection to the advertising service executed on the another computing device being unavailable, a proxied request for a manifest to a proxy advertising service executed by the client computing device;

determining, by the client computing device, a connection history of the client computing device, wherein the connection history indicates how frequently the network connection to the advertising service is available;

selecting, by the proxy advertising service executed by the client computing device, an advertisement from a plurality of advertisements stored in the client computing device based upon the connection history of the client computing device, wherein a lower frequency of availability of the network connection causes the advertisement having a higher maximum impression threshold to be selected;

generating a manifest that indicates the advertisement is to be presented by the client computing device; and presenting, by the client computing device, the advertisement for rendering by the client computing device contemporaneous to a rendering of a media item.

14. The method of claim 13, further comprising obtaining, by the client computing device, the plurality of advertisements from the advertising service in response to the network connection being available.

15. The method of claim 13, further comprising:

storing, by the client computing device, an indication of a presentation of the advertisement when the network connection is unavailable; and communicating, by the client computing device, the indication of the presentation to the advertising service in response to the network connection being available.

16. The method of claim 13, further comprising:

storing, by the client computing device, an indication of interactions with respect to the advertisement; and communicating, by the client computing device, the indication of interactions to the advertising service in response to the network connection being available.

17. The method of claim 13, wherein the advertisement is determined based at least in part on a frequency of availability of the network connection to the advertising service or a duration of availability of the network connection to the advertising service.

18. The method of claim 13, wherein the advertisement is determined based on advertising terms associated with the plurality of advertisements, the advertising terms defining at least one of a number of presentations for a respective one of the plurality of advertisements or a time range for presenting a respective one of the plurality of advertisements.

19. The method of claim 13, wherein the advertisement is determined based on presentation rules associated with the plurality of advertisements and the media item.

20. The non-transitory computer-readable medium of claim 1, wherein the program, when executed, further causes the client computing device to at least:
- receive an additional request for a manifest corresponding to the video media item stored in the client computing device; and
- communicate, in response to the network connection to the advertising service executed on another computing device being available, the additional request for the manifest to the advertising service.

* * * * *